June 16, 1942.    R. H. FROST    2,286,723
SELF-LOADING VEHICLE
Filed Jan. 10, 1941    3 Sheets-Sheet 1

INVENTOR.
Roy H. Frost
BY
*[signature]*
ATTORNEY.

June 16, 1942. R. H. FROST 2,286,723
SELF-LOADING VEHICLE
Filed Jan. 10, 1941 3 Sheets-Sheet 3

INVENTOR.
Roy H. Frost
BY
ATTORNEY.

Patented June 16, 1942

2,286,723

UNITED STATES PATENT OFFICE

2,286,723

SELF-LOADING VEHICLE

Roy H. Frost, Fresno, Calif., assignor of one-fourth to Edward J. Harp, Corcoran, and one-fourth to Luther F. Thornburgh, and one-fourth to Harold I. Berg, both of Fresno, Calif.

Application January 10, 1941, Serial No. 373,923

6 Claims. (Cl. 214—78)

This invention relates to dumping-body trucks, my principal object being to provide a device, mounted on the truck, by means of which the same may be quickly loaded from a heap or accumulation of material on the ground without the use of a power shovel or other separate implement such as is now generally used.

A further object is to provide a device for the purpose which may be put out as an attachment which may be readily applied to a standard dumping truck without altering the construction and arrangement of any part of the latter, and which may be easily removed if its use on any one truck is no longer desired.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
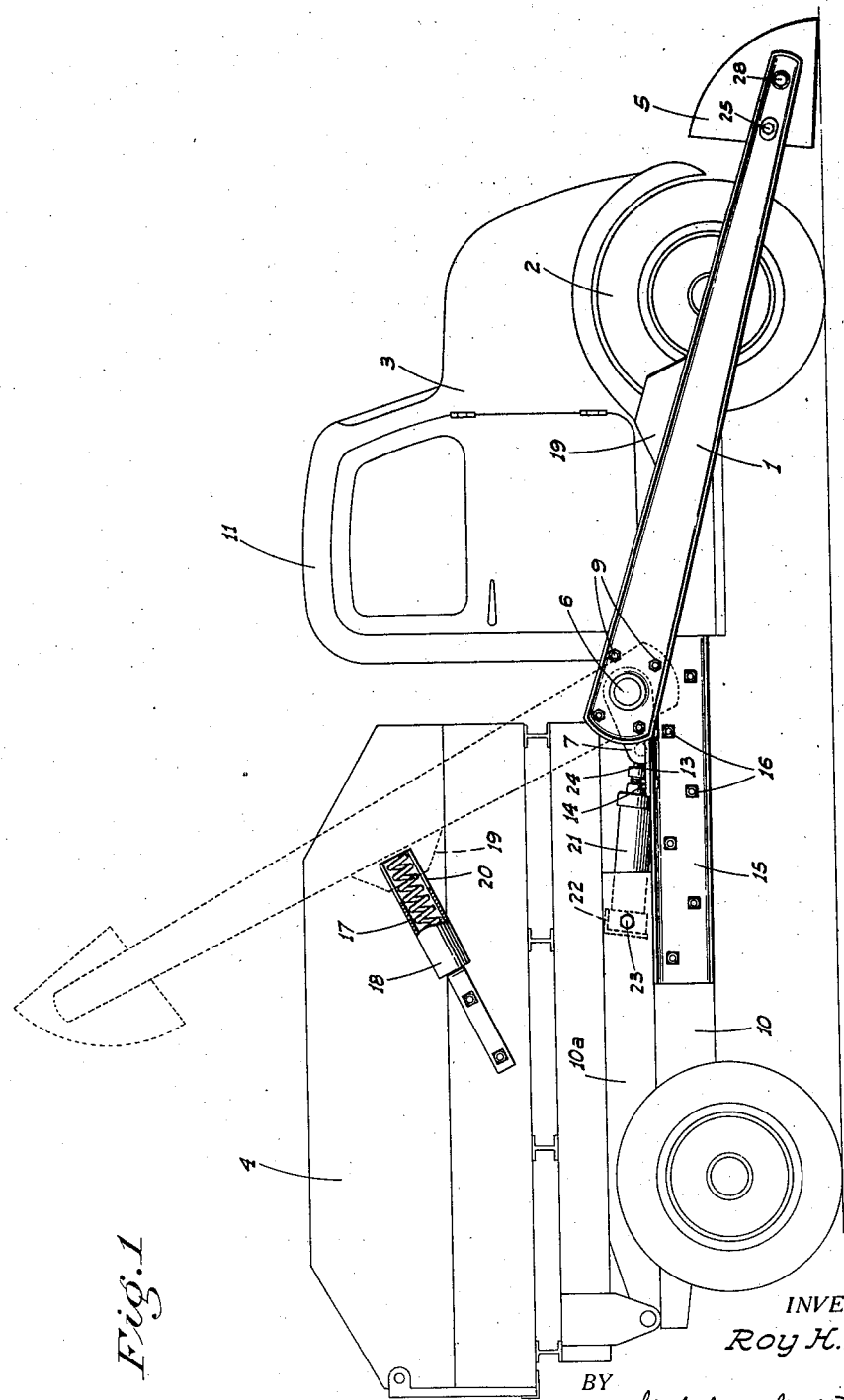
Figure 1 is a side outline of a dumping truck showing my loader mounted thereon and in a material engaging position.
Figure 2:
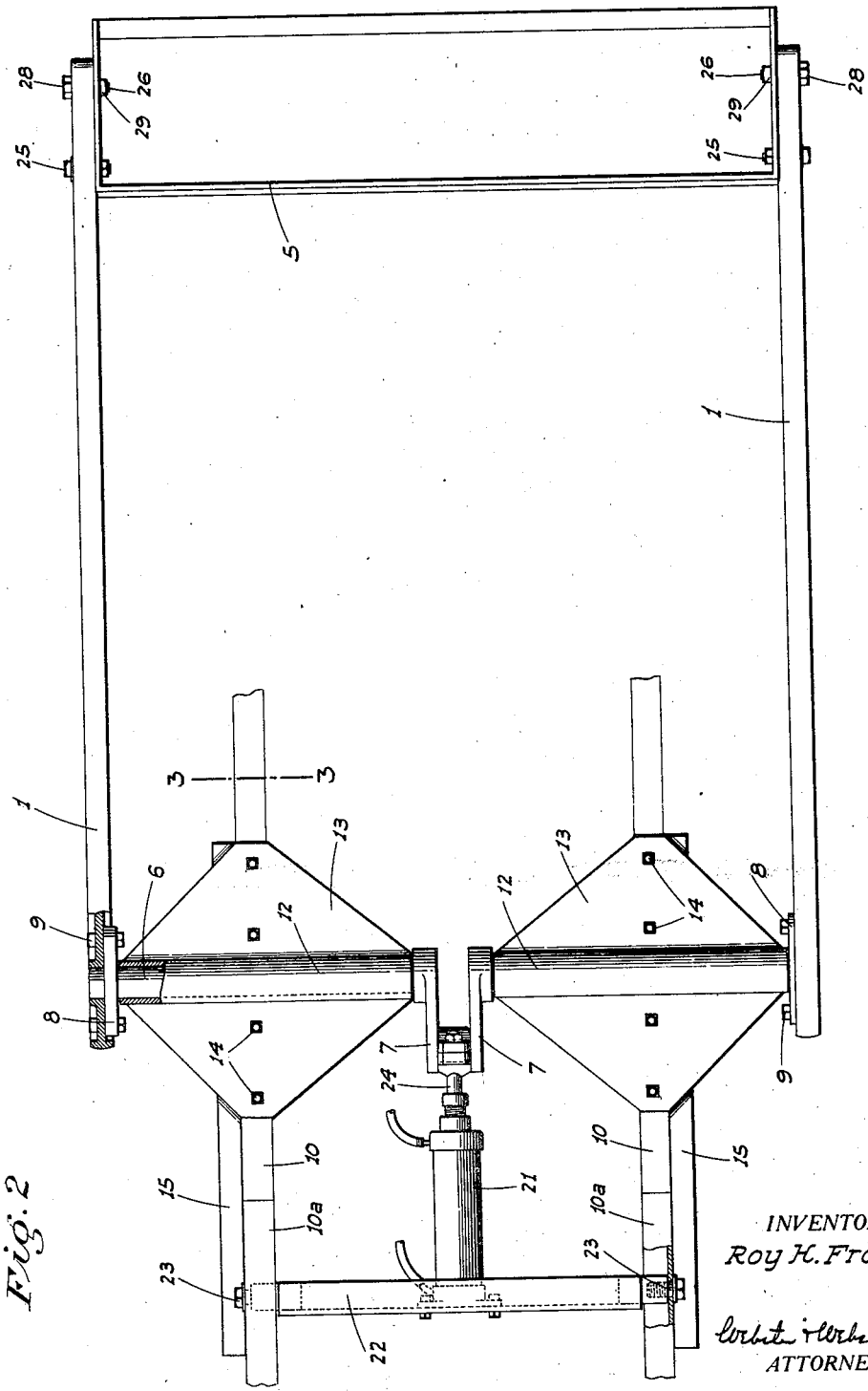
Figure 2 is a top plan view of the device.
Figure 3:
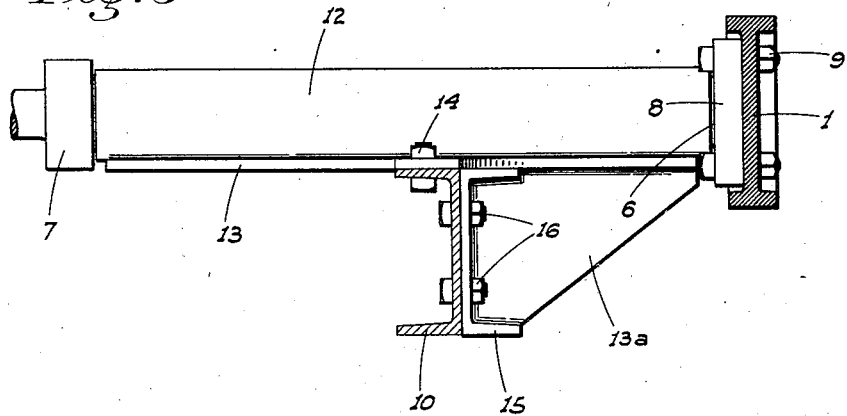
Figure 3 is a fragmentary transverse section on line 3—3 of Fig. 2.
Figure 4:
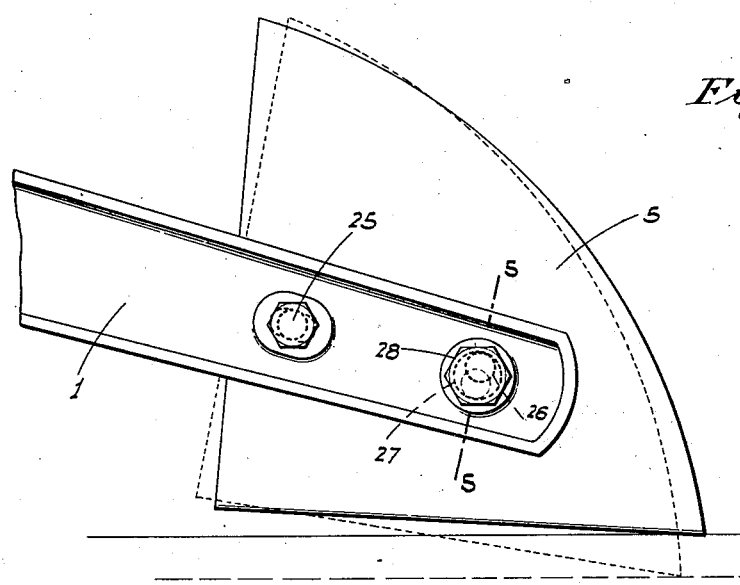
Figure 4 is a fragmentary enlarged side view of a side arm showing its adjustable connection with the scoop.

Referring now more particularly to the characters of reference on the drawings, the loading device comprises rigid side arms 1, spaced apart sufficiently to clear the front wheels 2 and other chassis parts of the truck 3, as well as the sides of the dump body 4 of the truck. A forwardly facing scoop 5 extends between and is adjustably connected to the arms 1 at their forward end in a particular manner which will be described later.

The arms are rigidly connected at their rear end and turnably mounted on the truck by means of a cross shaft 6 having a crank 7 formed thereon intermediate its ends. At its ends, the shaft has pads 8 which abut against the inner face of the arms adjacent their rear end and are rigidly but removably secured thereto by bolts 9. By reason of this feature, the arms and scoop may be removed from the truck at any time without disturbing the remainder of the apparatus.

The shaft is turnably mounted on top of the main side frames 10 of the truck just back of the cab 11 by means of suitably lubricated bearing sleeves 12 which engage the shaft sections for their full extent between pads 8 and the cheeks of the crank 7. The sleeves are welded on relatively large plates 13 which overlie and are secured on frames 1 by bolts 14. The plates are also rigidly secured to depending longitudinal channel members 15 which extend alongside and abut against frames 1 on the outside, and are secured thereto by bolts 16. Members 15 are braced to plates 13 by transverse gusset plates 13a. In this manner a very rigid bearing structure for the shaft is provided, which can be easily applied to and removed from the truck. The length of arms 1 is such that when swung forwardly from a raised position, the scoop will clear the front of the truck, so that it may engage the ground and gather a load with forward movement of the truck. When the arms are swung back, the scoop will clear the cab and will finally overhang the truck body in a discharging position as indicated in dotted lines in Fig. 1.

In order to limit such rearward movement of the arms, normally slack compression springs 17 are mounted in sleeve-like housings 18 secured on the sides of body 4 in such position that the springs are at right angles to the arms when the latter reach the desired rearward limit of movement. Projections 19 on the corresponding edge of the arms then enter longitudinal slots 20 cut in housings 18 and engage the springs enclosed therein, as indicated.

The shaft 6 is turned to shift the arms and scoop from one position to the other by means of a hydraulic unit behind the shaft. This unit comprises a cylinder 21 in line with crank 7 and secured at its rear end on a crossbeam 22. This beam is turnably supported at its ends from the upper side frames 10 of the truck by removable trunnions 23.

A piston rod 24 projects from the forward end of the cylinder and engages crank 7. The crank is set relative to the arms 1 so that when the latter are in a forward position, the crank projects to the rear, and the piston rod is retracted in the cylinder, as shown in Fig. 1. The crank shaft pin is then below dead center position relative to shaft 6 and trunnions 23. The dump control mechanism of the body being hydraulic, as is practically universal, the pump for this control mechanism may of course be used to provide pressure for cylinder 21. In operation, the truck is driven up to the material to be loaded, the scoop is lowered, and the truck advanced until the scoop is full. The arms are then raised to discharge the scoop into the body, the action of springs 17 when they come into play assuring a complete discharging action from the scoop.

Figure 5:
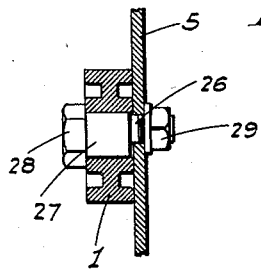
Figure 5 is a cross section on line 5—5 of Fig. 4.

The above operations are continued until the truck is fully loaded, the arms then remaining in their rearward position while the truck is driven to the point where the load is to be discharged. The bottom of the scoop, which is substantially flat, is disposed at an acute angle to the ground when in loading position. In order that this angle may be altered when desired or rendered necessary by wear at the forward edge of the scoop, the latter is secured on the arms in the following manner:

Each arm has a pivot bolt 25 connecting the arm and adjacent side plate of the scoop toward the rear end of the same. Ahead of bolt 25 a pivot stud 26 is turnable in the scoop, this stud having an eccentric head 27 turnable in the arm 1, as clearly shown in Fig. 5. Head 27 is provided with a nut-like extension 28 whereby it may be turned, the stud having a nut 29 thereon so that the parts may be clamped against relative movement when the desired setting has been obtained. The flow of fluid to and from cylinder 21, which governs the movement of the scoop arms, is of course controlled from the cab of the truck.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A loading device for an open-topped truck body comprising a pair of side arms spaced apart a distance greater than the width of the truck and body, a scoop supported by and extending between the arms at their forward end, a transverse shaft connecting the arms at their rear end, means to rotate the shaft, the truck having spaced side frames above which the shaft extends, separate bearing sleeves about the shaft, plates on which the sleeves are fixed overlying and resting on the frames and means removably securing the plates on the frames.

2. A loading device for an open-topped truck body comprising a pair of side arms spaced apart a distance greater than the width of the truck and body, a scoop supported by and extending between the arms at their forward end, a transverse shaft connecting the arms at their rear end, means to rotate the shaft, the truck having spaced side frames above which the shaft extends, separate bearing sleeves about the shaft, plates on which the sleeves are fixed overlying and resting on the frames, longitudinal members secured on and depending from the sleeves in position to abut against the side frames and means removably securing the plates and members on said frames.

3. A loading device for an open-topped truck body comprising a pair of side arms spaced apart a distance greater than the width of the truck and body, a scoop supported by and extending between the arms at their forward end, a transverse shaft, means to turnably mount the shaft on the truck adjacent the forward end of the body, means to control the rotation of the shaft, relatively large faced pads on the shaft at its ends, the inner side faces of the arms adjacent their rear end being relatively wide and abutting said pads, and means removably securing the arms to the pads.

4. A loading device for an open-topped truck body comprising a pair of side arms spaced apart a distance greater than the width of the truck and body, a scoop supported by and extending between the arms at their forward end, a transverse shaft connecting the arms at their rear end, the truck having spaced side frames over which the shaft extends, said shaft having a crank centrally of its ends and between said side frames, means to actuate the crank, bearing sleeves on the shaft portions on opposite sides of the crank, said bearing sleeves extending substantially the full length of said shaft portions, plates on which said sleeves are fixed for substantially their full length, said plates overlying and resting on said side frames, and means securing the plates on said frames.

5. A loading device for an open-topped truck body comprising a pair of side arms spaced apart a distance greater than the width of the truck and body, a scoop supported by and extending between the arms at their forward end, means pivotally mounting the arms at their rear end on the truck, means to control swinging of the arms from a position with the scoop engaging the ground ahead of the truck to a discharge position with the scoop overhanging the truck body, and cushion stop means mounted on opposite sides of the truck body in position for engagement by corresponding arms when the scoop reaches said discharge position, said stop means comprising elongated sleeve-like housings mounted on the sides of the truck body and opening toward the arms when the latter are in scoop discharging position, a compression spring in each of said housings, and an element on each arm arranged to enter the corresponding housing from the open end and to engage the adjacent end of the spring in said housing.

6. A device as in claim 5 in which the element on each arm comprises a vane secured on edge to the arm, the corresponding housing being slotted lengthwise on opposite sides and from the open end for the reception of said vane, the spring normally projecting to a point substantially at the open end of the housing.

ROY H. FROST.